Feb. 15, 1938.    L. E. STEINMAN    2,108,454
SIGNALING DEVICE FOR VEHICLES
Filed March 8, 1934    2 Sheets-Sheet 1

Inventor
Louis Edward Steinman
By Murray y Zugelter
Attorneys

Feb. 15, 1938. L. E. STEINMAN 2,108,454
SIGNALING DEVICE FOR VEHICLES
Filed March 8, 1934 2 Sheets-Sheet 2
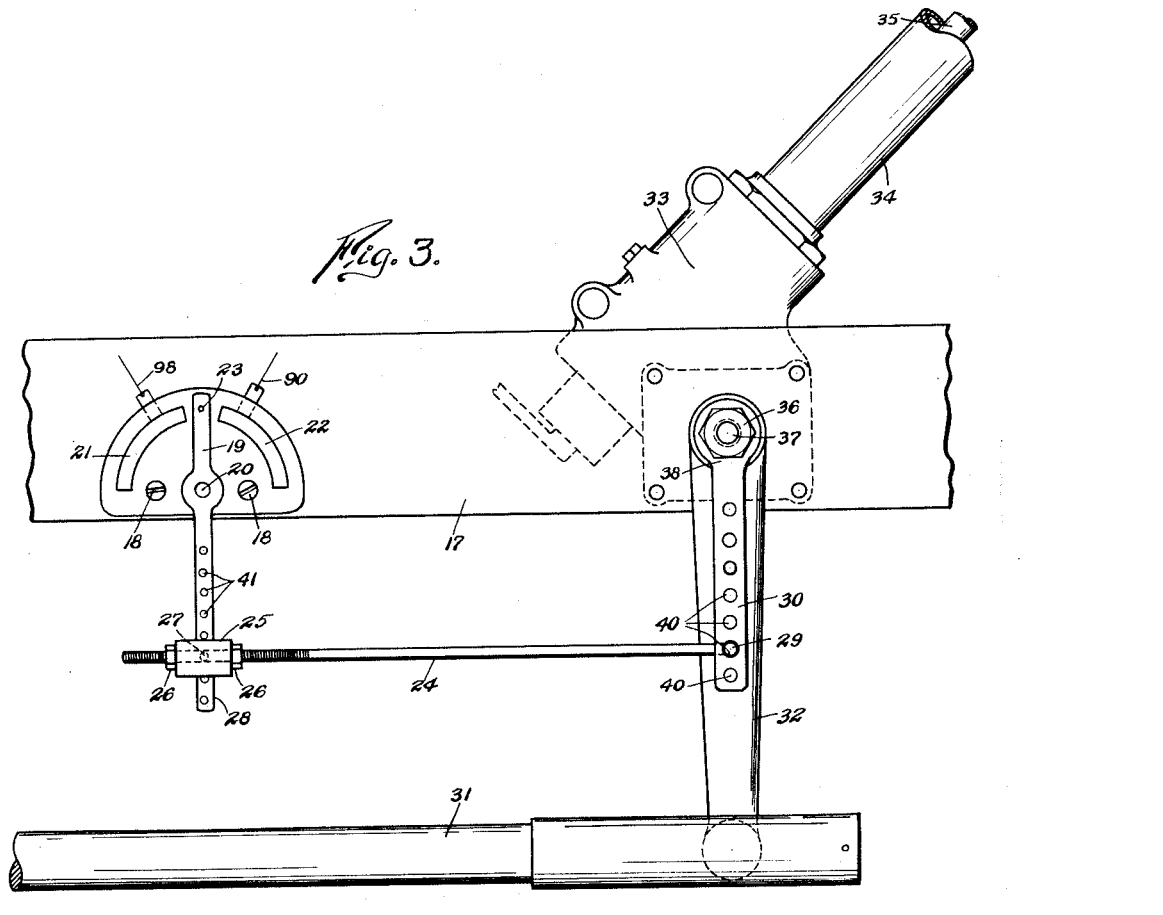
Inventor
Louis Edward Steinman
By Murray q Zugelter
Attorneys Patented Feb. 15, 1938

2,108,454

UNITED STATES PATENT OFFICE 2,108,454

SIGNALING DEVICE FOR VEHICLES

Louis Edward Steinman, Cincinnati, Ohio

Application March 8, 1934, Serial No. 714,616

19 Claims. (Cl. 177—339)

This invention relates to a device for indicating or signaling right and left turns to be executed by the driver of a vehicle.

An object of the invention is to provide a simple, inexpensive, and easily operated signaling device for vehicles, which at the option of the driver will operate automatically, when the steering wheels of the vehicle are turned, in the event that the driver of the vehicle fails to manually actuate the device in advance of the turning movement.

Another object of the invention is to provide improved means associated with a direction signaling device of the above character, which, upon actuation of the device either manually or automatically as above stated, will maintain the signal until a turn has been completely executed and the vehicle wheels restored substantially to the normal straight-ahead position.

Another object is to provide a device of the above stated character, which will not undesirably automatically extinguish a given signal in the event that the driver finds it necessary to turn the vehicle wheels in a direction opposite to the direction signaled, prior to executing the signaled turn.

Another object is to provide means whereby the device is caused to operate in the same manner whether the turn to be executed is a sharp turn or a wide turn.

A further object of the invention is to provide, in association with the device above referred to, a telltale or auxiliary signal means which is energized whenever the main signaling device is properly operating, but which will not affect the proper operation of the main signaling device in the event that the tell-tale or auxiliary signal means itself becomes out of order. The tell-tale signal means is arranged also to employ standard and not special electrical bulbs or globes.

Other objects include: the provision of hand or foot operated momentary contact switches in association with means for maintaining the signal until the indicated turn is completely executed and the vehicle returned to the normal straight-ahead position; the provision of a novel control switch actuated by the steering gear of the vehicle; and the provision of an electrical connection with the vehicle ignition switch, or a master switch, whereby the entire signaling device is rendered inoperative regardless of the position of the steering wheel or steering gear; the provision of means whereby the device will not in ordinary use display right and left turn signals simultaneously; the provision of means whereby the signals can be changed from one to the other selectively, by merely depressing or closing the proper switches successively regardless of whether the vehicle is being driven straight ahead or to the right or left; the provision of simple means adapting the system for controlling either a pair of rear signal lights, or two pairs of signal lights at the front and rear of the vehicle, without dismantling or modifying the circuit controlling elements; the provision of means for selectively rendering the device automatically operative by turning of the steering gear, or not, at the will of the operator; and the provision of an improved type of tell-tale system for indicating the condition of the signaling means.

The foregoing and other objects are attained by the means described herein and disclosed in the accompanying drawings, in which:

Fig. 3 is an elevational fragmental view showing one manner of associating an element of the invention with a vehicle steering gear.

Figures 1, 2:
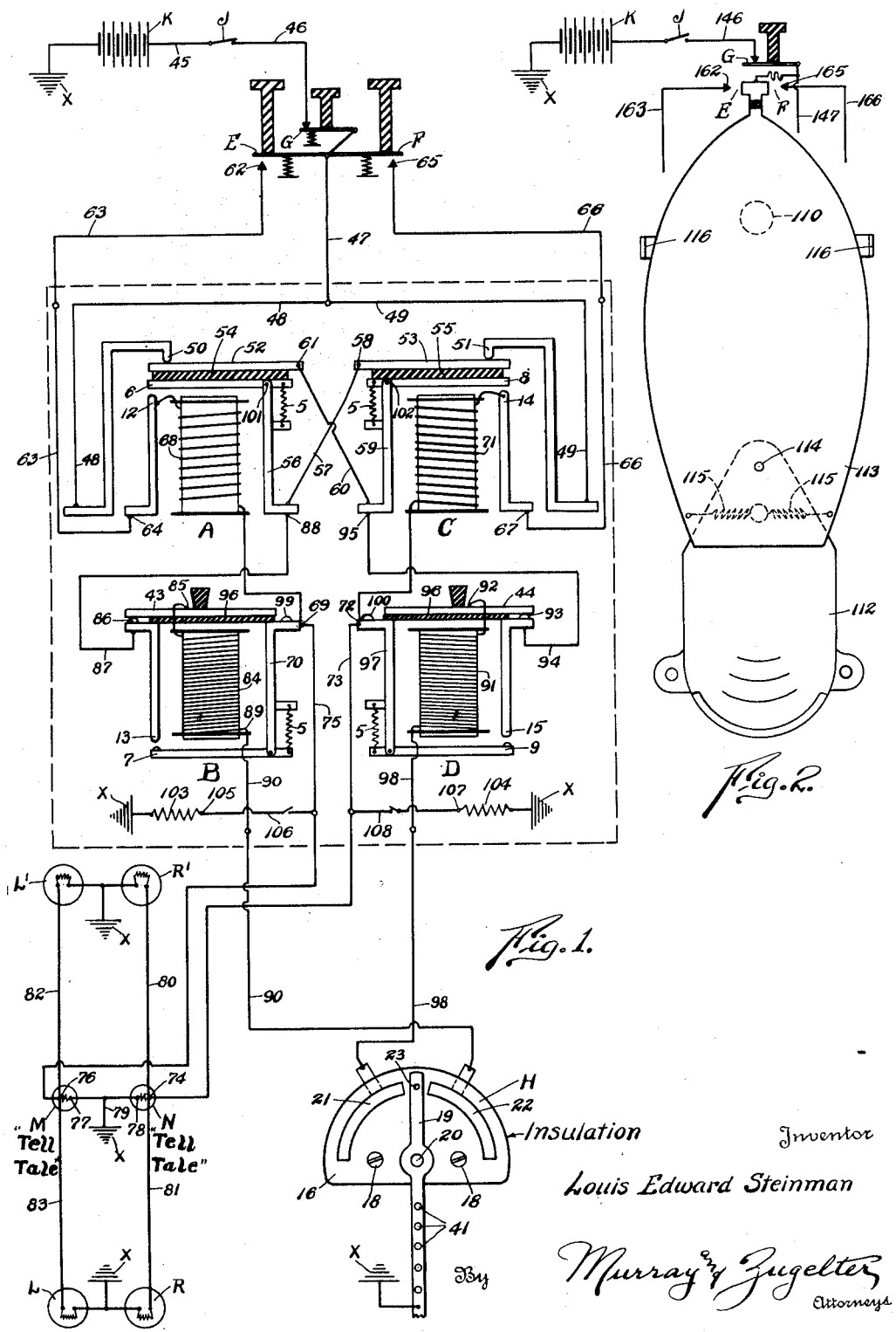
Fig. 1 is a wiring diagram embodying the means of the invention.
Fig. 2 is a plan view of a foot operated switch means adapted for use with the device of the invention.

In Fig. 1 of the drawings, the characters A, B, C and D indicate relays or electro-magnetic circuit controllers, having the movable armatures 6, 7, 8, and 9, respectively. The free ends of the armatures are adapted to be yieldingly held in spaced relationship with fixed electrical contacts, as indicated at 12, 13, 14 and 15, in accordance with common practice in the construction of relays. Springs 5 may be employed to hold the armatures (which are also switch elements) in the open circuit position as shown, or, if desired, the inherent resiliency of members 6, 7, 8 and 9 may be relied upon to perform this function.

The characters E, F, and G indicate a group of three momentarily actuatable switches for manually controlling certain electrical circuits, and these switches preferably are conveniently located within the vehicle body and within reach of the driver's hands or feet. Switch E is the left turn signal initiating switch, and switch F is the right turn signal initiating switch. Depression of these switches effects energization of the corresponding left turn signal means L and L', and the right turn signal means R and R'. The switch G is a signal normalizing switch, the function of which is to de-energize either of the signal means in the event that the driver gives a turning signal and thereafter decides to keep the vehicle on a straight course. The normalizing switch need not be used to effect a change of signals, as this is accomplished by merely closing the proper switch after the improper signal is given as will be described in detail hereinafter.

The device indicated at H is an electrical circuit controller or switching device that is adapted to be actuated by a movable part of the steering gear, as exemplified in Fig. 3. The device H is arranged to perform a number of operations, most of which are referred to in the objects at the head of this description.

The characters J and K represent, respectively, the ignition switch and the battery of a vehicle. The switch J may be the same switch that ordinarily controls the power unit or motor of the vehicle, or it may be a separate switch. In either case, the switch J may properly be termed a master switch because of its complete control over the electrical system.

M and N are tell-tale signals which are either audible or visible signals within the hearing or sight range of the driver of the vehicle. The tell-tale device M is arranged to indicate to the driver the condition of the left turn signal means L and L', and device N indicates the condition of the right turn signal means R and R'. The characters X indicate grounds for the electrical circuits. The signal means L' and R' may be mounted at the front of a vehicle, while L and R may be located at the rear thereof.

The steering gear operated switch, or device H, comprises a base member 16 which is preferably of fiber or other material nonconductive of electricity, and said base is adapted to be secured to an automobile frame member 17 (Fig. 3) in any suitable manner such as by means of the bolts or screws 18. The base supports a movable sliding contact member 19 which is pivoted as at 20 upon the base member. The sliding contact member is grounded as at x and may under certain conditions be placed in operative electrical connection with one pole or terminal of the source of electricity K, by reason of its movement about the pivot 20 to engage one of the contact strips or segments 21 or 22. If desired, a contact point 23 may be fixed upon the member 19 for slidingly engaging the elongated conductors 21 and 22. The electrical connection of members 21 and 22 with the battery is complete so long as the master switch J is closed with the selector switches 43 and 44 of relays B and D disposed in the positions illustrated. The function of switches 43 and 44 will be set forth in detail hereinafter.

As is evident from the disclosure of Fig. 3, the contact point 23 may be shifted to engage or abut one or the other of the segments or contact bars 21 or 22 when the vehicle wheels are turned to the left or right by means of the steering gear. The contact member 21 may, for convenience of explanation, be termed the right contact of the steering gear switch, and the other contact member 22 may be termed the left contact of the steering gear switch. The contact elements 21 and 22 may be either straight or curved, however, the arrangement of curved segments illustrated provides a simple, convenient, and satisfactory construction. The inherent resiliency of the member 19 may be relied upon to maintain the contact point 23 of member 19 in yielding engagement with the segments, or, if desired, a spring may be associated with the pivotal mounting 20 for this purpose.

Movement of the arm or member 19 about the pivot 20 may be effected by means of an associated connecting member 24 (Fig. 3) having one of its ends adjustably secured to a pivoted block or the like 25 by means of the nut or locking device 26. The block 25 may have a pivotal mounting 27 upon the free or extended exposed end 28 of arm 19. The opposite end of the connecting rod or member 24 may have a swivel or rocking joint connection 29, (Fig. 3), with a member 30 adapted for attachment to a suitable moving part of the steering gear, for example, the steering rod 31 or pitman arm 32. As will readily be understood, the steering gear switch H may be operated by any one of the several moving parts of the steering gear. The character 33 indicates the usual gear box of a steering mechanism, and 34 indicates a conventional steering post which embraces the usual steering wheel shaft 35.

The means illustrated in Fig. 3 for operating the steering gear switch H, and the said switch itself, are considered patentably novel and particularly desirable because of the simplicity thereof and the construction whereby installation is rendered quick, easy, and dependable, using the same nut or fastening means 36 which the manufacturer furnishes to secure the pitman arm onto the shaft 37. The member 30 has its head end 38 perforated to receive the shaft 37, and said member is installed by merely backing off the ordinary nut 36, applying the member 30 to the shaft, and then replacing the nut. Member 30 is, in effect, an auxiliary pitman arm which is secured in substantial parallelism, and in close proximity with, the pitman arm 32; and said member 30 may conveniently be made in flat plate form. The reason for disposing the member 30 closely alongside the pitman arm, is to afford a simple resilient means for maintaining the angularly turned end 29 of rod 24 in position within one of the series of openings 40 formed in member 30. The openings 40, as well as similar openings 41 in switch arm 19, are provided for the purpose of adjusting the operating period of switch H. It is to be noted that the simple and inexpensive member 30 is the only extra part to be applied to the steering mechanism, and it cannot slip out of place without indicating a dangerous looseness of the pitman arm. The member 30 therefore functions not only to actuate the switch H, but also to indicate a dangerous condition of the steering mechanism, for should the nut 36 become loose the signaling system could not function in the manner intended.

The switch or controller indicated by the letter H is capable of considerable modification to render it substantially free of wear and arcing, and the use of reciprocating parts rather than rotary sliding contacts shall be considered within the scope of the invention in the absence of restrictions to the contrary, in the claims.

The manner of electrically associating the various elements, is as follows: The conductor 45 connects the source of electrical energy with one side of the master switch J, and a conductor 46 connects said switch with the normally closed signal normalizing switch G. From the switch G, the current is conducted by means of a wire 47 to a pair of branch conductors 48 and 49 which are electrically associated, respectively, with the stationary contacts 50 and 51 of relays A and C. Each of the relays A and C has a conductor, indicated at 52 and 53 which preferably moves with the parts 6 and 8, respectively, the parts 6 and 52 of relay A being separated by suitable insulation 54, and the parts 8 and 53 of relay C being likewise insulated as indicated at 55. It will be noted that the unitary structure 6—54—52 of relay A is normally yieldingly held in an elevated position at which the contacts 50 and 52 are in abutting or closed circuit relationship. In like manner, the contact parts 51 and 53 of relay C are maintained yieldingly in contacting relationship.

The armature part 6 of relay A is electrically associated with an electricity conducting base element 56 which, by means of a conductor 57 is electrically connected as at 58 to the electricity conducting part 53 of the armature of relay C. The metallic base part 59 of relay C is in like manner connected, by means of a conductor 60, to the contact member 52 of relay A at the location indicated by the character 61.

The normally open left signal initiating switch E has its stationary contact 62 connected by means of a conductor 63, to the contact 12, as indicated at 64; in like manner the stationary contact 65 of the right signal initiating switch F is electrically connected by means of a conductor 66, to the contact 14 of relay C as indicated at 67.

One end of the winding 68 of the relay A coil is electrically connected to the contact 12 while the opposite end of said coil has connection at 69 with the metallic frame part 70 which supports the normally open armature or contact member 7 of relay B. The coil winding 71 of relay C electrically connects the contact 14 with the normally open contact 9 of relay D, by reason of the connection indicated at 72. From the connection at 72, a conductor 73 leads to one side of the filament of telltale lamp N as indicated at 74, while the corresponding contact 69 of relay B has electrical connection through a conductor 75, with one side 76 of the filament in telltale lamp M. The remaining contacts 77 and 78 of lamps M and N are connected to ground X, through a common conductor 79.

It is to be observed that the contacts 74 and 76 of the tell-tale lamps have electrical connection with the front and rear signal devices L′, R′, L and R, in the manner indicated. More definitely, the contact 74 has a conductor 80 leading to the front right signal means R′, and a second conductor 81 leading to the right rear signal means R. Similarly, the contact 76 has a conductor 82 leading to the left front signal means L′ and a second conductor 83 leading to the left rear signal means L. As will be explained hereinafter, the set of signal means L′—R′ and its conductors may be omitted entirely from the combination if desired.

Relay B includes a coil 84 which has one of its ends 85 electrically connected with the slidable contact member 43, which normally, when in the position shown in Fig. 1, provides an electrical connection with a contact point 86 on the contactor part 13. From the contact point 86 a conductor 87 leads to the metallic frame member 56 and is electrically connected thereto as at 88. The opposite end 89 of coil 84 is electrically connected by means of a conductor 90 to the left contact segment 22 of the steering gear operated switch.

Referring now to coil 91 of relay D, it will be observed that one end of said coil has electrical connection as at 92 with the slidable contact element 44 of relay D, and by reason of the contact between 44 and part 93, said coil is placed in electrical communication with the contact 15 of relay D. Said contact 15 is provided with a conductor 94 that connects, at 95, with the metallic frame member 59 of relay C. Insulating strips or members 96 of the relays B and D, preclude passage of electric current normally from the sliding contactors 43 and 44 of said relays, to the frame parts 70 and 97, respectively. The coil 91 of relay D has electrical connection, by means of a conductor 98, with the right turn segment 21 of the steering gear switch H.

It may be stated that the sliding contact member 43 of relay B is adapted to be moved to the right, over the insulation 96 so as to make contact with a metallic point or contactor 99 on the frame member 70. In like manner, the sliding contact member 44 of relay D is adapted to be moved into contact with the point or contact 100 which is maintained upon the metallic frame part 97 of relay D. The purpose of shifting the sliding contact elements 43 and 44 to the position just mentioned will be fully explained in the operation of the device.

In describing this invention, it shall be assumed that the signal means L′, R′, L and R each draw two amperes of current. The tell-tale lamps M and N may draw an arbitrary small amperage. Under these conditions, the coils of relays A and C are wound with a sufficiently heavy wire to allow free passage of current therethrough, and each of the coils is wound with a proper number of turns of such wire so that a flow of four amperes therethrough will attract their respective armatures which are pivoted at 101 and 102; but a passage of approximately two amperes through said coils of relays A and C should not be sufficient to attract their respective armatures. It is considered unnecessary to set forth the diameter and the number of turns of wire constituting the coils 68, as those figures will be determined, by electrical engineering calculations, according to the nature of the wire, core, the armature, and other factors pertaining to the construction of the relays. As is well known amongst persons skilled in the art, the crystal structure of a magnetic core material may vary, and the size of wire and the number of turns necessary to generate a required magnetic flux will be determined by taking into consideration the nature of the iron core of relay magnet.

The characters 103 and 104 indicate a pair of two-ampere resistors which are adapted to be cut out of circuit when both front and rear signal means L′—R′ and L—R, respectively, are used in the system. The resistors are retained in the circuit, however, when either the front signal means L′—R′, or the rear signal means L—R, are omitted from the system. It will be observed that one side of each resistor is connected to ground X. The side 105 of resistor 103 has a conductor 106 connecting it with the conductor 75 that leads from the frame part 70 of relay B to the contact 76 of tell-tale lamp M. Resistor 104 has its end 107 electrically connected by means of the conductor 108, to the conductor 73 which leads from the frame element 97 of relay D to the contact 74 of tell-tale lamp N.

The coils 84 and 91 of relays B and D, respectively, are shunt coils made up of fine wire wound in a proper manner to attract the armatures 7 and 9, respectively, upon passage of approximately one-fourth ampere therethrough. In fact, it is desirable to have the relays B and D to operate upon passage of a minimum of current through the coils thereof.

The operation of the device is as follows:

With the wheels of the vehicle placed in the straight ahead position, and the ignition or master switch J closed, the relative positions of the various elements of the device are indicated in Fig. 1. Closing the switch J places the entire system in condition for operation, and in the explanation which follows it will be assumed that switch J is closed. The operator of the vehicle, prior to actually executing a left turn which he desires to perform, momentarily depresses the left signal initiating switch E, whereby to complete a circuit through the conductors 45, 46, G, E, 62, 63, 64, 12, 68, 69, 75, 76, M, 77, 79 and ground X. From the contact or connection 76 of the tell-tale lamp M, current may flow through both of the conductors 82 and 83, whereby to energize the left front signal means L' and the left rear signal means L, as is evident. The tell-tale signal M will also be energized by reason of the flow of current through it to the ground wire 79. As the current of electricity thereby flowed through the coil of relay A, the armature 6—54—52 thereof was attracted so as to close the contacts 6—12. This closing of the contacts 6—12 resulted in a flow of electrical current from battery K through conductors 45, J, 46, G, 47, 49, 51, 53, 58, 57, 56, 101, 6, 12, 68, 69, 75, 76, M, 77, 79 and ground X, and through the signal means L and L'. Since the above electrical circuit includes the coil 68 of relay A, said circuit will be maintained with the left signal means and the corresponding tell-tale lamp energized after the operator removes pressure from and opens switch E.

Next, the operator proceeds to execute the turn indicated by the left signal means, and in actuating the steering gear accordingly to execute the turn, the steering element 32 and rod 24 (Fig. 3) are moved forwardly (or to the left as viewed in Fig. 3) whereby to rotate the movable contact element 19 of switch H into contacting relationship with segment 22 of said switch. This movement of the contact element 19 grounds the segment 22, whereby to complete an electrical circuit including the ground connection X of element 19, the element 19, segment 22, conductors 90, 84, 85, 43, 86, 87, 88, 57, 58, 53, 51, 49, 47, G, 46, J, 45, K and back to ground X. The coil of relay B being thus energized, the armature of said relay is moved so as to close the contacts 7—13, whereby an additional circuit is closed for maintaining the left signal and tell-tale means in the energized condition while the vehicle wheels are turned. The said additional circuit is from battery K, through conductors 45, J, 46, G, 47, 49, 51, 53, 58, 88, 87, 86, 13, 7, 70, 69, 75, 76 and through each of the signal elements M, L and L' to the ground. Thus, the front and rear signal means L' and L, respectively, and the tell-tale lamp M, are maintained energized while the turn is being executed. Also, as soon as the contact 7—13 is closed there are two sources of current arriving at point 69, and proceeding through 75, 76 and the signal means M, L and L' to the ground X. One of these circuits flows from 56, through 6, 12, 68 to 69, which of course includes coil A. The other circuit is from 56, through 88, 87, 13, 7, 70 to 69. The closing of this last named circuit by the closing of contact 7—13, results in such a decrease of current flow through the coil of relay A, as will afford release of the armature of said relay, thus breaking the circuit through said coil of relay A, at contact 6—12. In other words the coil of relay A is shunted out upon the closing of contact 7—13.

The driver's next act is to return the steering gear to the normal straight-ahead position, and in so doing he causes the steering element 32 and rod 24 to return the movable contact 19 of switch H to the normal non-contacting position shown, thereby breaking the circuit through the coil of relay B. By breaking said circuit, the magnetism of the B relay coil is destroyed, and the armature thereof is released to separate the contacts 7 and 13, thereby cutting off all current supply to the signal elements M, L and L'. The entire system is now neutralized and ready for another actuation.

If the driver of the vehicle had turned either slightly or considerably to the right before executing the indicated left turn, under the circumstances set forth in the preceding explanation, no change in signals would have resulted, nor any right signal means energized, because, while the coil of relay A is energized and is holding armature 52—54—6 down in contact with 12, it is also holding open the contact 50—52. The contact 50—52 being open, makes it impossible for any current to flow through the coil of relay D, if element 19 passes onto segment 21, while coil of A is kept energized. This is considered a very desirable feature, as traffic conditions often necessitate jogging or cutting in prior to executing a desired turn.

Sometimes the operator will depress the left signal initiating switch and thereafter decide to remain on a straight course. It is then necessary to depress the normalizing switch G in order to de-energize the signal means. Depression of the switch G simply breaks the main circuit wire 47 so as to neutralize any of the relays that might have been energized, prior to depression of said switch G, to hold closed any of the various circuits.

It is not unusual for an operator to depress the left signal initiating switch and thereafter decide to make a right turn, and to accordingly wish to change the signal. To change the signal, the operator need only depress the proper switch, it being unnecessary in the present device to first depress the normalizing switch. By way of example, it will be assumed that the operator has erroneously or unintentionally depressed the left signal switch E, whereby, as previously explained, the relay A would be kept energized until the vehicle wheels are turned. Subsequent depression of the right turn signal initiating switch, to change the signal, will close the circuit embracing the battery K, and conductors 45, J, 46, G, F, 65, 66, 67, 14, 71, 72, 73, 74, 78 and 79 to the adjacent ground connection, thereby energizing the tell-tale signal N. From the contact 74 of signal N, conductors 80 and 81 lead to the right turn signal devices. As the current of electricity thereby flows through the coil of relay C, the armature 8—55—53 thereof is attracted so as to close the contacts 8—14, and open the contacts 51—53. Thus opening of contacts 51—53 causes the circuit through the relay A to be broken, thus de-energizing coil of relay A, and allowing armature 6—54—52 to spring open, closing contacts 50—52, and separating contacts 6—12, thereby cutting off all current supply to the signal elements M, L and L', whereupon the circuit of the left signal means is broken simultaneously with the closing of the circuit of the right signal means. Upon release of the right turn signal initiating switch by the operator, the right turn signal means is maintained in an energized condition through the closed circuit comprising the elements K, 45, J, 46, G, 47, 48, 50, 52, 61, 66, 59, 8, 14, 71, 72, 73, 74, 78, 79 and the adjacent ground X. From the contact 74, leads 80 and 81 supply current to the grounded signal devices R' and R, respectively. The circuits above described are closed whenever the right signal initiating switch F is closed momentarily by an operator.

Automatic energization of signals, upon turning of the steering gear, is provided by the system as disclosed in Fig. 1. To explain this, it may be assumed that the steering gear is turned to the right, so as to place the movable contact 19 of switch 14 in abutment upon the segment 21, whereupon a circuit will be completed embracing the then grounded segment 21, conductors 90, 91, 92, 44, 93, 94, 95, 60, 61, 52, 50, 48, 47, G, 46, and the conductors leading from 46 to the battery. The completion of said circuit would of course energize the shunt relay D, which would effect closing of the relay contacts 9—15, whereupon live wire 94 would supply current to the conductors 15, 9, 97, 72, 73, 74 and through the right turn signal means N, R and R'. In identically the same manner, a left turning of the steering gear will ground the segment 22 of switch H and effect the closing of similar circuits through the shunt relay B for automatically energizing the left turn signal means M, L and L'.

The above described automatic means may be disabled entirely, should the operator so desire, by shifting the sliding contacts 43 and 44 of relays B and D, respectively, to positions at which they engage the contacts 99 and 100, respectively instead of the contacts 86 and 93 with which they are engaged in the showing of Fig. 1. Such shifting of the sliding contacts obviously renders impossible any passage of current through the coils of relays B and D for supplying current to the signal means, by reason of any rotational movement of contact member 19. This shifting of the sliding contacts, however, does not interfere with the manual operation of the system and the automatic de-energization of signals upon completion of the turn indicated, in the manner described at the beginning of the specification.

Whether the driver is using either the automatic or non-automatic means just described in the last two paragraphs above, the following will hold true. Regardless of the position of the steering gear, a desired signal can be displayed and maintained upon mere momentary depression of the proper switch E or F. In other words, a right turn signal can be given whether the vehicle is being driven straight ahead, turning to the left, or turning to the right, and such given signal will be maintained until the turn signaled is completely executed and the steering gear then returned to the straight-ahead position. The same is true of the left turn signal. It is desired also to repeat that the signals can be changed from one to the other by merely depressing the switches E and F alternately, regardless of the course of the vehicle and without use of the normalizing switch G. It is impossible to at any time have both the right and left signal means energized simultaneously so as to result in a confusion of signals.

The preceding description and explanation has presupposed the use of a pair of front signal elements L' and R', and a pair of rear signal elements L and R. Each of said elements was assumed to operate on approximately a two ampere current consumption. Now, it may be desirable to omit either the front pair of signal devices or the rear pair of signal devices. By disconnecting one pair of signal devices and connecting the two-ampere grounded resistors 103 and 104 with the leads or conductors 75 and 73, respectively, the entire system will operate in the manner previously explained, and without altering any of the coil windings of the relays A or C. It will be recalled that said relays, in the specific set-up disclosed, are wound to operate on approximately four amperes, but not on two. The reason for this construction is given in the following paragraph.

Assuming that each of the signal means L, R, L' and R' draws two amperes of current in the Fig. 1 disclosure, it will be evident that a total of four amperes is drawn when the front and rear signal means R and R' are energized. This is a sufficient amperage to hold the armature of relay C in the current-supplying condition. Should one of said signal means burn out or otherwise become inoperative, the current flow through the coil of relay C would drop to two amperes, with the result that the armature would be released whereby to terminate the supply of current to the signal means and to the tell-tale device N. The operator is thus informed of the fact that the system is not in proper working order. The same condition obtains in the event that one or both of the left turn signal means becomes out of order or inoperative. The vehicle operator thereby is always informed as to the condition of the signaling system. Should the tell-tale signals M and N be omitted, or become defective or inoperative, proper operation of the signaling devices would not be interfered with as the pairs of leads 80—81 and 82—83 are connected to the conductors 73 and 75, respectively, ahead of the tell-tale signals. Moreover, the small loss in amperage passing through either of the coils of relays A or C, due to such dropping out or inoperation of a small candle power dash lamp bulb, would not affect proper operation of the relays and their power to pull down their respective armatures.

The foregoing completes the description and explanation of the Fig. 1 disclosure. In Fig. 2 is shown a foot pedal arrangement, which preferably is associated with an accelerator control 110, whereby the function of hand-operated switches E and F of Fig. 1 may be performed by the use of the foot. The pedal preferably comprises a heel plate 112 which is fixed relative to the vehicle frame, and a toe part 113 which has a lateral, as well as a vertical, movement about the pivot 114. A spring arrangement 115 yieldingly maintains the toe part in axial alignment with the heel plate 112. When the toe part is moved to the left, the switch E may be momentarily closed; and movement of the toe part to the right may momentarily close the switch F. The characters 116 indicate stops or extensions for precluding slipping of the operator's foot from the pedal. The elements indicated at 146, 163, 162, 165, 166, and 147 correspond to the elements 46, 63, 62, 65, 66, and 47 of Fig. 1. Inasmuch as the switch means associated with the pedal are operated to effect closing of an electrical circuit in substantially the same manner as the hand-operated push button switch means, it is to be understood that the word "manual", when used in the claims, shall have the broad dictionary meaning of "personal".

The particular mode of wiring illustrated is exemplary only, and may be altered or modified to conform with current knowledge on the subject of wiring. Furthermore, it is appreciated that the various circuit make-and-break contacts may be altered in accordance with common practice to render them substantially free of arcing and wear.

It is to be understood that various modifications and changes in the structural details of the device may be made, within the scope of the appended claims, without departing from the spirit of the invention.

What is claimed is:

1. A vehicle direction signaling means comprising in combination a steering gear controlled switch, a left turn signal initiating switch and a right turn signal initiating switch both within the reach of an operator of the vehicle, a left turn signal device and a right turn signal device supported upon the vehicle for indicating to persons other than the operator the operator's intention to steer the vehicle from a straight course, a source of electricity, electrical circuit means including the source of electricity and the signal initiating switches and the signal means, and electrical devices included in said electrical circuit means for energizing said signal means alternately upon alternate momentary closing of the signal initiating switches in all positions of the steering gear controlled switch and for maintaining said signal means alternately and separately energized during the entire period between alternate circuit closing actuations of said signal initiating switches, and an electrical circuit including the steering gear controlled switch for de-energizing the signal means upon completion of an indicated turn.

2. A vehicle direction signaling means comprising in combination a left turn signal initiating switch and a right turn signal initiating switch both within the reach of an operator of the vehicle, a pair of left turn signal means and a pair of right turn signal means supported upon the vehicle for indicating to persons other than the operator the operator's intention to steer the vehicle from a straight course, in operator's telltale device for each of the pairs of signal means, a pair of relays each having a switch armature and a coil wound to attract the armature upon passage therethrough of a predetermined current amperage drawn when one pair of signal means is energized, but to release the armature when the amperage decreases, a source of electricity and electrical conductors including said source of electricity, the switches, the coils, the pairs of signal means, and the tell-tale devices, the signal means of each pair being electrically connected in parallel arrangement whereby closing of a given signal initiating switch effects operation of one of said relays and energization of the corresponding tell-tale device and its associated pair of turning signal means, provided that sufficient amperage passes through the coil of said relay to attract the armature switch thereof, the latter provision being dependent upon the operative condition of both signal means of the pair sought to be energized.

3. A vehicle direction signaling means comprising in combination a left turn signal initiating switch and a right turn signal initiating switch both within the reach of an operator of the vehicle, a pair of left turn signal means and a pair of right turn signal means supported upon the vehicle for indicating to persons other than the operator the operator's intention to steer the vehicle from a straight course, an operator's tell-tale device for each of the pairs of signal means, a pair of relays each having a switch armature and a coil wound to attract the armature upon passage therethrough of a predetermined current amperage drawn when one pair of signal means is energized, but to release the armature when the amperage decreases, a source of electricity and electrical circuit means including said source of electricity, the switches, the coils, the pairs of signal means, and the tell-tale devices, the signal means of each pair being electrically connected in parallel arrangement whereby closing of a given signal initiating switch effects operation of one of said relays and energization of the corresponding tell-tale device and its associated pair of turning signal means, provided that sufficient amperage passes through the coil of said relay to attract the armature switch thereof, the latter provision being dependent upon the operative condition of both signal means of the pair sought to be energized, and means under the control of the steering gear of the vehicle for normalizing the energized signal means upon such movement of said steering gear as is necessary for executing the turn signalled and for restoring the normal straight-ahead direction of vehicle movement.

4. A vehicle direction signaling means comprising in combination a left turn signal initiating switch and a right turn signal initiating switch both within the reach of an operator of the vehicle, a pair of left turn signal means and a pair of right turn signal means supported upon the vehicle for indicating to persons other than the operator the operator's intention to steer the vehicle from a straight course, an operator's tell-tale device for each of the pairs of signal means, a pair of relays each having a switch armature and a coil wound to attract the armature upon passage therethrough of a predetermined current amperage drawn when one pair of signal means is energized, but to release the armature when the amperage decreases, a source of electricity and electrical circuit means including said source of electricity, the switches, the coils, the pairs of signal means, and the tell-tale devices, the signal means of each pair being electrically connected in parallel arrangement whereby closing of a given signal initiating switch effects operation of one of said relays and energization of the corresponding tell-tale device and its associated pair of turning signal means, and maintains them energized provided that sufficient amperage passes through the coil of said relay to attract the armature switch thereof, the latter provision being dependent upon the operative condition of both signal means of the pair sought to be energized, means under the control of the steering gear of the vehicle for normalizing the energized signal means, and for automatically energizing a signal means corresponding to a turning movement commenced in the absence of a closing of the corresponding signal initiating switch by the operator.

5. A vehicle direction signaling means comprising in combination a left turn signal initiating switch and a right turn signal initiating switch both within the reach of an operator of the vehicle, a pair of left turn signal means and a pair of right turn signal means supported upon the vehicle for indicating to persons other than the operator the operator's intention to steer the vehicle from a straight course, an operator's telltale device for each of the pairs of signal means, a pair of relays each having a switch armature and a coil wound to attract the armature upon passage therethrough of a predetermined current amperage drawn when one pair of signal means is energized, but to release the armature when the amperage decreases, a source of electricity and electrical circuit means including said source of electricity, the switches, the coils, the pairs of signal means, and the tell-tale devices, the signal means of each pair being electrically connected in parallel arrangement whereby closing of a given signal initiating switch effects operation of one of said relays and energization of the corresponding tell-tale device and its associated pair of turning signal means, provided that sufficient amperage passes though the coil of said relay to attract the armature switch thereof, the latter provision being dependent upon the operative condition of the signal means of the pair sought to be energized, means under the control of the steering gear of the vehicle for normalizing the energized signal means, and for automatically energizing a signal means corresponding to a turning movement commenced in the absence of a closing of the corresponding signal initiating switch by the operator, and means shiftable by the operator for selectively conditioning the steering gear controlled means to preclude all control over a signal by the steering gear operated means except that of de-energizing a previous manually energized signal.

6. A vehicle direction signaling means comprising in combination a left turn signal initiating switch and a right turn signal initiating switch both within the reach of an operator of the vehicle, a pair of left turn signal means and a pair of right turn signal means supported upon the vehicle for indicating to persons other than the operator the operator's intention to steer the vehicle from a straight course, an operator's tell-tale device for each of the pairs of signal means, a pair of relays each having a switch armature and a coil wound to attract the armature upon passage therethrough of a predetermined current amperage drawn when one pair of signal means is energized, but to release the armature when the amperage decreases, a source of electricity and electrical conductors including said source of electricity, the switches, the coils, the pairs of signal means, and the tell-tale devices, the signal means of each pair being electrically connected in parallel arrangement whereby closing of a given signal initiating switch effects operation of one of said relays and energization of the corresponding tell-tale device and its associated pair of turning signal means, provided that sufficient amperage passes through the coil of said relay to attract the armature switch thereof, the latter provision being dependent upon the operative condition of both signal means of the pair sought to be energized, and a pair of resistance elements each constructed to draw an amperage approximating that of one of the signal means, and connectible with the current supply to the signal means, whereby one pair of signal means may be omitted without altering the current carrying capacity of the relay coils.

7. A vehicle direction signaling means comprising in combination a momentary contact left turn signal initiating switch and a momentary contact right turn signal initiating switch both within the reach of an operator of the vehicle, a pair of left turn signal means and a pair of rght turn sgnal means supported upon the vehicle for indicating to persons other than the operator the operator's intention to steer the vehicle from a straight course, an operator's tell-tale device for each of the pairs of signal means, a pair of relays each having a switch armature and a coil wound to attract the armature upon passage therethrough of a predetermined current amperage drawn when one pair of signal means is energized, but to release the armature when the amperage decreases upon failure of one of the signal means of said pair to draw current, a source of electricity and electrical circuit means including said source of electricity, the switches, the coils, the pairs of signal means, and the tell-tale devices, the signal means of each pair being electrically connected in parallel arrangement whereby closing of a given signal initiating switch effects operation of one of said relays and energization of the corresponding tell-tale device and its associated pair of turning signal means, provided that sufficient amperage passes through the coil of said relay to attract the armature switch thereof, the latter provision being dependent upon the operative condition of both signal means of the pair sought to be energized, means including a second pair of relays under the control of the steering gear of the vehicle for normalizing the energized signal means, and for automatically energizing a signal means corresponding to a turning movement commenced in the absence of a closing of the corresponding signal initiating switch by the operator, and a master switch in connection with the electrical circuit means for disconnecting the source of electricity from each and every element of the combination.

8. A right and left turn indicator for vehicles having a steering gear, comprising in combination a right and a left signal means supported upon the vehicle, a signal initiating switch for the right signal means and a signal initiating switch for the left signal means, said signal initiating switches being mounted for actuation selectively by an operator of the vehicle, means for maintaining the signal means operative after momentary depression of said signal initiating switches, until the steering gear has been operated to execute the turn signaled and thereafter returned to substantially the normal straight-ahead steering position, and including means operative upon momentarily depressing the signal initiating switches alternately, to alternately energize and de-energize the right or left signal means in any position of the steering gear.

9. A right and left turn indicator for vehicles having a steering gear, comprising in combination electrical right and left turn signal means supported upon the vehicle, electrical means including a signal initiating switch for the right signal means and a signal initiating switch for the left signal means, said signal initiating switches being mounted for selective actuation by an operator of the vehicle, electrical tell-tale signals electrically connected in parallel arrangement with the right and left signal means, for indicating the condition of the right and left signal means, and means operative upon momentary closing of said signal initiating switches for maintaining the signal means operative until the steering gear has been operated to execute the turn signaled and thereafter returned to substantially the normal straight-ahead steering position, and comprising an electromagnetic switch to open the circuit of the tell-tale signal means upon a termination or reduction of current consumption in the turning signal means.

10. A right and left turn indicator for vehicles, comprising in combination an electrical right and a left turn signal means supported upon the vehicle, an electrical circuit including a manually operated signal initiating switch for the right signal means, a manually operated signal initiating switch for the left signal means, and a set of two relay means operative upon momentary closing of one of said signal initiating switches for maintaining the signal means operative during a predetermined time, an electrical tell-tale signal means for indicating an operative or inoperative condition of the right and left signal means, an electrical circuit including said tell-tale signal means, and the winding of one of said relays connected in said circuit, and comprising an electromagnetic switch to open the circuit of the tell-tale signal means upon a termination or reduction of current passing through the winding of the other relay.

11. A right and left turn indicator for vehicles having a source of electricity and a steering gear, comprising in combination a right and a left signal means and a pair of tell-tale signals supported upon the vehicle, a signal initiating switch for the right signal means and a signal initiating switch for the left signal means, said signal initiating switches being mounted for actuation by an operator of the vehicle, a steering gear operated switch including a pair of electrically separated contacts and a third contact relatively movable with respect to said pair of contacts, a pair of electrical circuits, a pair of electromagnetic switches, each having a coil included in one of said circuits with the source of electricity and one of the electrically separated contacts of the pair of such contacts, the relatively movable contact aforesaid being connectible in either of said circuits to ground the winding of either coil thereby to cause a limited current flow through one of the coils for closing the corresponding switch of said coil, a second pair of electrical circuits each including the source of electricity, one of the electromagnetic switches, a tell-tale signal, and a turning signal means, said last named circuits being completed through the electromagnetic switches upon energization of their respective coils, another pair of electrical circuits each of which includes a signal initiating switch, the source of electricity, and one turning signal means and its associated tell-tale signal, and magnetic elements operative upon closing said last named circuits for maintaining said signal means and tell-tale signal energized until one of the circuits of the steering gear switch is closed to substitute a closed circuit for the turning signal means.

12. A vehicle direction signaling means comprising in combination, a momentary contact left turn signal initiating switch and a momentary contact right turn signal initiating switch both within the reach of an operator of the vehicle, a left turn signal means and a right turn signal means supported upon the vehicle for indicating to persons other than the operator the operator's intention to steer the vehicle from a straight course, a source of electricity, electrical circuit means including the source of electricity, the signal initiating switches, and the signal means, whereby closing of the switches effects energization of the corresponding signal means, a device operated by the steering gear of the vehicle for deenergizing, upon completion of an indicated turn, a signal means previously energized by a corresponding signal initiating switch, and means to preclude control of a signal means by the steering gear operated device in the absence of a previous manually initiated signal.

13. A vehicle direction signaling means comprising in combination, a momentary contact left turn signal initiating switch and a momentary contact right turn signal initiating switch both within the reach of an operator of the vehicle, a left turn signal means and a right turn signal means supported upon the vehicle for indicating to persons other than the operator the operator's intention to steer the vehicle from a straight course, a source of electricity, electrical circuit means including the source of electricity, the signal initiating switches, and the signal means, whereby closing of the switches effects energization of the corresponding signal means, a device operated by the steering gear of the vehicle for deenergizing, upon completion of an indicated turn, a signal means previously energized by a corresponding signal initiating switch, means whereby the signal means normally are maintained idle regardless of operation of the steering gear device resulting from steering the vehicle from a straight course, and including means operative, in all positions of the steering gear device, for manually energizing the signals by means of the signal initiating switches, and operative thereafter for extinguishing the signal thus energized, upon execution of a turn corresponding to that indicated by such signal.

14. In combination, a vehicle having a front and a rear end, and including a steering gear and a source of electricity with two terminals of opposite polarity, one of which terminals is grounded, a left and a right direction signaling lamp each having a grounded contact and a free contact, and mounted upon the vehicle for indicating to persons other than the operator, an intention to steer the vehicle from a straight course, and a left and a right tell-tale lamp placed within the view of the vehicle operator, each of said lamps having two contacts one contact of each being electrically connected with the grounded terminal of the electricity source, an electricity conductor joining the free contact of the left direction signaling lamp with that of the left tell-tale signal lamp, a second electricity conductor joining the free contact of the right direction signaling lamp with that of the right tell-tale signal lamp, a pair of electricity feed wires one of which is electrically connected to the first mentioned electricity conductor, and the other of which is connected to the second mentioned electricity conductor, means for selectively connecting said feed wires to the remaining terminal of the source of electricity, and including means for terminating the flow of electricity to one of said tell-tale signal lamps upon failure of current to pass through its associated direction signaling lamp, and an electrical switch associated with the steering gear and co-operating with part of the aforesaid means, to open the circuit of that feed wire which supplies electricity to a turning signal previously energized, upon movement of the steering gear from a straight course position, to a turning position indicated by said signal, and back to the straight course position.

15. A vehicle direction signaling means comprising in combination, a left turn signal initiating switch and a right turn signal initiating switch both within the reach of an operator of the vehicle, a left turn signal means and a right turn signal means supported upon the vehicle for indicating to persons other than the operator the operator's intention to steer the vehicle from a straight course, a source of electricity, electrical circuit means including the source of electricity, the signal initiating switches, and the signal means, whereby closing of the switches effects energization of the corresponding signal means, a device operated by the steering gear of the vehicle for de-energizing, upon completion of an indicated turn, a signal means previously energized by a corresponding signal initiating switch, means whereby the signal means normally are maintained idle regardless of operation of the steering gear device resulting from steering the vehicle from a straight course, and including means operative, in all positions of the steering gear device, for manually energizing the signals by means of the signal initiating switches, and operative thereafter for extinguishing the signal thus energized, upon execution of a turn corresponding to that indicated by such a signal.

16. A direction signaling means for vehicles having directive wheels, and comprising in combination, a left turn signal initiating switch and a right turn signal initiating switch, a left turn signal means and a right turn signal means, a source of electricity having a ground and a live conductor, said switches being normally open circuited and connected with the live conductor, a pair of relays each having a heavy wire wound electromagnetic coil, a pivoted double switch armature, and a pair of stationary contacts one for each movable contact of the armature switch, each of said stationary contacts being normally in abutment upon a movable contact of the armature switch and normally electrically connected with the live conductor, the remaining stationary contacts of the relays being connectible with the live conductor by closing of their corresponding signal initiating switches, and each being connected with one end of its associated coil winding so that upon closing of the signal initiating switches the coil windings are placed in electrical connection with the live conductor of the source of electricity, the opposite end of each coil winding being electrically connected directly to a contact of a corresponding signal means of which the remaining contact of each is grounded, a pair of conductor straps electrically connecting the non-corresponding movable contacts of the relay armature switches to one another, a third relay comprising a light gauge wire wound electromagnetic coil, a normally open movable contact to be moved by energization of said coil, and a stationary contact to be struck by the movable contact, said stationary contact being electrically connected to one end of the winding of the third relay coil and also to a movable contact of one of the first mentioned relays, an electrical connection between the movable contact of the third relay and the before-mentioned opposite end of a coil winding of said one of the first mentioned relays, a switch contact electrically connected to the other end of the winding of the third relay coil, and a movable co-operative switch contact for grounding the winding of the third relay coil upon movement of the directive wheels to guide the vehicle from a straight course.

17. A direction signaling means for vehicles having directive wheels, and comprising in combination, a left turn signal initiating switch and a right turn signal initiating switch, a left turn signal means and a right turn signal means, a source of electricity having a ground and a live conductor, said switches being normally open circuited and connected with the live conductor, a pair of relays each having a heavy wire wound electromagnetic coil, a pivoted double switch armature, and a pair of stationary contacts one for each movable contact of the armature switch, each of said stationary contacts being normally in abutment upon a movable contact of the armature switch and normally electrically connected with the live conductor, the remaining stationary contacts of the relays being connectible with the live conductor by closing of their corresponding signal initiating switches, and each being connected with one end of its associated coil winding so that upon closing of the signal initiating switches the coil windings are placed in electrical connection with the live conductor of the source of electricity, the opposite end of each coil winding being electrically connected directly to a contact of a corresponding signal means of which the remaining contact of each is grounded, a pair of conductor straps electrically connecting the non-corresponding movable contacts of the relay armature switches to one another, a third relay comprising a light gauge wire wound electromagnetic coil, a normally open movable contact to be moved by energization of said coil, and a stationary contact to be struck by the movable contact, said stationary contact being electrically connected to a movable contact of one of the first mentioned relays, an electrical connection between the movable contact of the third relay, one end of its coil winding, and the before-mentioned opposite end of a coil winding of said one of the first mentioned relays, a switch contact electrically connected to the opposite end of the winding of the third relay coil, and a movable co-operative switch contact for grounding the winding of the third relay coil upon movement of the directive wheels to guide the vehicle from a straight course.

18. A right and left turn indicator for vehicles having a steering gear and a source of electricity, comprising in combination a right and a left turn signal means supported upon the vehicle for indicating to persons other than the operator the operator's intention to steer the vehicle from a straight course, a normally open-circuited signal initiating switch and a relay for the right signal means, and a normally open-circuited signal initiating switch and a relay for the left signal means, each of said relays including a double contact movable armature and a coil for actuating same, one contact of each armature being normally open circuited and the other contact of each armature being normally electrically connected to the source of electricity, a pair of electrical circuits each including a signal initiating switch, a relay coil, a signal means and the source of electricity, each of said circuits being completed by closing of its associated normally open-circuited signal initiating switch to energize its associated relay coil which in turn moves the armature to close the normally open-circuited contact thereof, thereby to complete the electrical circuit through an associated signal means for energizing same; a second pair of electrical circuits each in electrical connection with the source of electricity, the normally closed contact of one relay armature, the normally open contact of the other relay armature, and the signal means corresponding to an actuated signal initiating switch; and electrical means under the control of the steering gear of the vehicle for shunting out either relay coil upon movement of the steering gear from a straight course position to a turning position corresponding to a previously actuated signal means, while maintaining said previously actuated signal means operative until the steering gear has been returned to substantially the straight course position.

19. A right and left turn indicator for vehicles having a steering gear, comprising in combination a right and left turn signal means supported upon the vehicle, electrical means for actuating either of the signal means while preventing actuation of both signal means simultaneously, and including a signal initiating switch and a relay having a movable double contact armature for the right signal means, and a signal initiating switch and a relay having a movable double contact armature for the left signal means, said signal initiating switches being mounted for actuation by an operator of the vehicle and said relay armatures being electrically cross-connected by means of two separate conductors each joining one armature contact with the non-corresponding contact of the other armature, to maintain an energized condition of a signal means subsequently to an initial energization effected by a signal initiating switch, and means under the control of the steering gear of the vehicle, for shunting out the relay so actuated, upon movement of the steering gear from a straight course position to a turning position corresponding to a previously actuated signal means, while maintaining the said previously actuated signal means operative until the steering gear has been returned to substantially the straight course position.

LOUIS EDWARD STEINMAN.